United States Patent [19]

Delmon et al.

[11] 4,233,175

[45] Nov. 11, 1980

[54] REAGENT FOR TREATING FLUE GASES AND METHOD OF PREPARATION

[75] Inventors: Bernard Delmon, Wavre; Ghislain Van Houte, Louvain, both of Belgium

[73] Assignee: Unibra, Brussels, Belgium

[21] Appl. No.: 938,973

[22] Filed: Sep. 1, 1978

Related U.S. Application Data

[63] Continuation-in-part of Ser. No. 628,663, Nov. 4, 1975, Pat. No. 4,115,518.

[30] Foreign Application Priority Data

Nov. 6, 1974 [FR] France ................. 74 36862

[51] Int. Cl.$^2$ ............................................. C09K 3/00
[52] U.S. Cl. ................................ 252/192; 423/244; 423/553; 252/189; 252/190
[58] Field of Search ............... 252/190, 189, 192, 193; 423/242, 244, 554, 555; 55/73

[56] References Cited

U.S. PATENT DOCUMENTS

| | | | |
|---|---|---|---|
| 2,165,784 | 7/1939 | Bunage | 423/242 |
| 3,345,125 | 10/1967 | Kruel et al. | 55/73 X |
| 3,578,390 | 5/1971 | Kruel et al. | 55/73 X |
| 3,632,306 | 1/1972 | Villers-Fisher | 423/242 |
| 3,637,347 | 1/1972 | Jonokin et al. | 423/244 |

*Primary Examiner*—Benjamin R. Padgett
*Assistant Examiner*—J. L. Barr
*Attorney, Agent, or Firm*—Bucknam and Archer

[57] ABSTRACT

A reagent for treating flue gases constituted by an intimate mixture, in the solid state, of a main component selected from the group comprising alkaline-earth, oxides, hydroxides, carbonates, bicarbonates, and mixtures thereof, and an additive selected from the group comprising hydrogen halide acids, salts of such acids of alkaline metals, ammonium, and alkaline-earth metals, sulphuric acid, and mixtures thereof, said additive being present in an amount of from 0.1 to 15% by mole respect to said main component.

8 Claims, No Drawings

REAGENT FOR TREATING FLUE GASES AND METHOD OF PREPARATION

This application is a continuation-in-part of U.S. Ser. No. 628,663, filed Nov. 4, 1975 which has issued as U.S. Pat. No. 4,115,518 on Sept. 19, 1978.

The present invention is related to the treatment of flue gases, and more specifically to reagents useful for removing noxous compounds, such as oxygen-containing sulphur compounds from waste gases, as well as to the preparation and applications of such reagents.

Various gas treatment methods are already known, said methods providing desulphurization of said gases and being adapted to treat gases containing sulphur oxygenated compounds, such as the sulphur oxides to be found in flue gases from power plants. Various methods are known, entailing the oxidization of sulphur and its compounds and leading to the elimination of that element in the sulphite, or sulphate, form. The most attractive methods are those requiring the use of reagents that mainly comprise alkaline-earth compounds with an alkaline reaction, such as, e.g., oxides, hydroxides, carbonates, bicarbonates, since such reagents are normally cheap.

Among these methods are to be distinguished those wherein the treatment is carried out as a wet process, in a washing operation wherein the gas under treatment is caused to pass through water containing the reagent in solution or suspension, from those wherein the treatment is carried out as a dry process, by causing the gas to contact a similar reagent in a more or less divided solid state. The wet methods are advantageous in that they ensure a pretty high efficiency as regards gas-desulphurization and the generation of sulphate, provided additives such as manganese, iron, or copper, soluble salts are added to the solution, said additives acting in the manner of oxidizing agents or as oxidization catalysts. These additives, however, have the drawback that they require introducing steam into the gas under treatment and cooling the latter, the method being usually carried out at a low temperature, of from about 80° C. (175° F.) to about 150° C. (300° F.). Therefore, the dry gas-desulphurization methods are currently to be preferred, while however having other drawbacks. In particular, although the latter methods are normally carried out at very high temperatures (of about 1,000° C. or 1,800° F) and are more complicated, the desulphurization efficiency is nevertheless low and the conversion of the reactants remains far from complete. Therefore, the used reagents must later on be submitted to extra regeneration, or conversion, treatments so as to obtain by-products of some value. The latter treatments render the methods considerably less economical.

Although the reagents used in these methods might sometimes happen to contain various compounds, in particular when they consist of natural minerals, however no satisfactory solution to these problems has yet been brought forth.

The present invention relates more specifically to dry processes. In particular, the invention aims at improving the reactivity reagents for dry treatment of flue gases, at increasing the rate of absorption of sulphur-oxygen compounds in such reagents in the solid phase and, accordingly, at providing the desulphurization of flue gases and other waste gases under technological and economical conditions suitable on a commercial scale.

The invention provides a reagent for treating flue gases, comprising an intimate mixture, in the solid state, of a main component consisting of at least one alkaline-earth oxide, hydroxide, carbonate, or bicarbonate, and of an additive in an amount of from about 0.1 to 15% by mole with respect to said main component, said additive being constituted by at least one compound selected from the group comprising hydrogen halide acids, salts of such acids of an alkaline metal, ammonium or an alkaline-earth metal, and sulphuric acid.

Such a reagent is adapted, in particular, to be used for desulphurizing waste gases containing sulphur and sulphur oxides as well as oxygen, in particular flue gases from thermal power-plants or other industries. Its high reactive power with respect to sulphur oxides and to oxygen can be taken advantage of in directly producing sulphates from the reactive main component, the conversion rate being specially high in view of the presence of the additive. However, the reagent is also efficient for absorbing other impurities from the flue gases under treatment. For instance, it may be used for treating flue gases for defluorination purposes.

In the reagent according to the invention, the main component can be, e.g., a calcium and/or magnesium compound, such as a carbonate, an oxide or an hydroxide. More precisely, carbonates are generally preferred, since they have the advantage that they can consist of a natural mineral, such as calcite or dolomite.

According to one of the preferred embodiments of the invention, the additive is an halide of an alkaline or alkaline-earth metal or of ammonium. Hydrogen halides are FH, ClH, BrH, IH. They can all be used as additives in the invention. Hydrochloric acid and Hydrobromic acid are preferred. Salts suitable for same use are preferably sodium, potassium, calcium and ammonium halides, and particularly chlorides, and bromides. With $CO_3Ca$, such additives as $Cl_2Ca$, KCl, NaCl, and HCl are preferred in one of the embodiments of the invention.

The molar ratio of the additive with respect to the reagent main component is preferably from 0.1 to 10%, and preferably from 0.1 to 5%. However, the preferred values within the above ranges vary according to the way the reagent is used.

The preparation of the reagent can be carried out according to any conventional mixing process. It is, in particular, possible to carry out a mechanical mixing of the main component and a solid additive in the dry state, by crushing them, the advantage of that process being that it directly provides a dry powder. However, in order to improve the reagent efficiency in the absorption of the compounds to be removed, it appeared preferable to apply a preparation method consisting of impregnating the powdered main component with an additive in the liquid state, preferably in the form of a solution in a solvent such as water or an organic solvent, the thus obtained product being then dried so as to remove the solvent.

For carrying out the method, it is preferable to restrict the amount of solvent to the amount necessary for providing the distribution of the additive in the mass of reagent, viz. generally to an amount at most of about 2 milliliters of liquid per gram of reagent. The drying step can be carried out, in particular, by heating to about 120° to 250° C., until the solvent is fully eliminated. A molar ratio of from about 0.5 to 2% of additive is then usually sufficient for ensuring the optimum efficiency of the reagent.

In every instance, the reagent according to the invention is preferably in the form of a powder of an average grain-size within the 1–200 micron range; however, coarser powders, up to about 1000 microns, can also be used.

Another object of the invention lies in the application of the reagent such as specified above or prepared in accordance with the above description, to the desulphurization of flue gases or the generation of sulphites or sulphates, depending on the amount of oxygen available in the gases with which said reagent is brought into contact.

The reagents are used in the solid state, in powdered form, and disposed as an absorbent bed through which are circulated the gases to be treated, such as flue gases containing sulphur oxides and oxygen. Flow rate conditions are similar to those used in known methods. The gas treated should preferably contain at least ½ mole oxygen per each mole $SO_2$. Current flue gases contain enough oxygen, but if required, oxygen may be added to the gas to be treated so as to reach the above proportion. An excess of oxygen is not required.

One advantage of the method is to provide reagent high conversion rates and, therefore, not only to improve the desulphurization of the gases under treatment, but also, contrary to previous methods, to ensure a direct production of relatively pure sulphates, of commercial use, and, in particular, the production of pure calcium sulphate when treating flue gases using a calcium carbonate containing reagent. The reagent is thus advantageously collected as a valuable by-product when it has been converted into sulphate by treating flue gases. A further advantage of the gas-treatment method according to the invention lies in that it can be carried out over a wide temperature range, within the wide range of from 250° to 1100° C., or even from 250° to 1300° C., when the main component is calcium carbonate.

According to a first way of carrying out the method, the treatment takes place at a temperature of from about 600° to 1100° C. As in conventional flue gas desulphurization methods, the reagent can then be injected into the gas at the very level of the boiler burners. In that case, the main advantage of the reagent according to the invention is that it provides a substantial increase of efficiencies, both as regards the conversion-rate and the conversion-yield from the reagent to a sulphate product.

According to another way of carrying out the method, the gas under treatment is brought into contact with the reagent at a moderately high temperature, preferably of from about 350° to 600° C. Preferably, the gas, in particular consisting of flue gases which have been freed from dust, is caused to pass through an absorbent bed wherein the reagent is, preferably, in the form of a powder with a grain-size of from 1 to 200 microns. Preferably, the gas velocity will be selected in connection with the powder grain-size, so as to maintain said powder as a fluidized bed. However, it is also possible to resort to any other conventional process for bringing a gas and a solid into contact, whether, for instance, the reagent is arranged as a fixed or a stirred bed, exposed to the gas or through which the gas passes, or the reagent is driven by the gas flow. Moreover, the reagent can be heated by the gas itself or by a separate heating appliance.

In that embodiment, the method according to the invention permits to avoid favourably the technical drawbacks inherent to injection methods, viz, in particular, the difficulty of uniformly distributing the reagent in the boiler, the problem raised by the short duration of contacts at high temperatures, the possible deposition of oxides and sulphates on the walls of the boiler, of the exhaust ducts and of the recovery systems, and the difficulty of separating the reaction products from dust and ashes.

The invention will now be illustrated by the disclosure of particular (but, by no means, restrictive) examples.

EXAMPLE I

Reagent samples are prepared as follows: dry calcium carbonate, with a grain-size of from 10 to 25 microns, is impregnated by an amount of water of the same weight, containing potassium chloride, in amounts of 0.5, 1 and 2% by moles with respect to $CaCO_3$.

Thus, for preparing 10 grams of $CaCO_3$ impregnated with potassium chloride in the molar ratio of 1%, 0.075 gram of dry KCl (viz 0.001 mole) is dissolved in 10 milliliters of water, then the thus-formed solution is mixed with the 10 grams of $CaCO_3$ (0.1 mole).

The various samples are then dried by heating in an oven up to a temperature of 200° C. The thus obtained products are absolutely dry.

The reagent samples are caused to react with a gaseous atmosphere containing sulphur dioxide and oxygen, in the ratio of half a mole of oxygen per each mole of $SO_2$. The reaction is carried out at the temperature of 540° C., for periods varying from 20 to 150 minutes.

The conversion of the reagent to calcium sulphate is substantial after a few minutes. The sulphatation yield, or mole percentage of the amount of carbonate converted into sulphate, is measured, and the following results are achieved.

| KCL additive (mole %) | Duration of contact in minutes | Sulphatation (mole %) |
| --- | --- | --- |
| 0.5 | 20 | 38 |
| 0.5 | 50 | 46 |
| 1 | 20 | 57 |
| 1 | 50 | 77 |
| 1 | 100 | 92 |
| 2 | 20 | 63 |
| 2 | 50 | 81 |
| 2 | 100 | 96 |

By way of comparison, it is to be noted that a reagent exclusively consisting of the starting calcium carbonate powder and used under the same conditions, would only provide a sulphatation yield of about 20%, after a contact of more than an hour.

EXAMPLE II

Calcium carbonate is mixed in the dry state with potassium chloride in amounts of 2, 5 and 10% by moles, respectively, with respect to calcium carbonate. Then, the mixture is crushed until an homogeneous powder with a grain-size of about 10 microns is obtained.

The reagent samples thus obtained are brought into contact with the same gaseous atmosphere as in Example I, at a temperature of 540° C., for contact durations of from 20 to 150 minutes. With a reagent containing 10% KCl by moles, the following sulphatation yields (determined as in Example I) are obtained.

26% after a 20 minutes contact
45% after a 50 minutes contact
74% after a 100 minutes contact

EXAMPLE III

Calcium carbonate, with a grain-size of from 2 to 10 microns, is impregnated with a calcium chloride solution. For each gram of $CaCO_3$ use is made of 1 milliliter of a solution with a concentration corresponding to 2% $CaCl_2$ by moles with respect to $CaCO_3$. The impregnated product is dried by heating to 200° C.

The sulphatation of the samples obtained is examined as disclosed in Example I, for reactions carried out at various temperatures. At the temperature of 280° C., the sulphatation rate is already equivalent to the rate which would require a temperature above 450° C. for non previously treated calcium carbonate.

After a one hour time reaction, the sulphatation yields of the reagent treated are about 25% molar at the temperature of 350° C. and 50% molar at the temperature of 445° C.

EXAMPLE IV

Calcium carbonate powder samples containing potassium chloride and calcium chloride, respectively, as an additive, in the same proportions as in Examples I and III, are prepared by impregnation. Impregnation is carried out by sprinkling the powder with 0.1 milliliter only of chloride aqueous solution at the appropriate concentration. The thus impregnated product is dried at 200° C.

The reagents obtained are approximately equivalent to those of Examples I and III, as regards their efficiency, determined by sulphatation rate (or speed) and sulphatation yield under the same conditions.

On the other hand, the treatment of carbonate calcium by water alone has no effect whatever on the reagent efficiency.

EXAMPLE V

The reagent main component used is powdered calcium oxide (CaO), with a grain-size of from 25 to 36 microns.

A reagent sample is prepared by mixing and crushing in the dry state, with KCl in the molar amount of 10%.

The sample is sulphated in an atmosphere containing half a mole of oxygen per mole of sulphur dioxide as in Example I, but at a temperature of 500° C. The sulphatation yield is 60% molar after 10 minutes reaction, and 80% after 40 minutes reaction.

It is to be noted, by way of comparison, that under the same conditions, a reagent of CaO alone does not permit to obtain sulphatation yields above 15%, even after much longer contact periods.

EXAMPLE VI

The reagent main component used is magnesia, having a grain-size of from 0.5 to 5 microns, whereas the additive is sulphuric acid. The reagent is prepared by impregnating the magnesia powder with 1 milliliter of a solution of sulphuric acid in water or in ether, per gram of MgO, the solution concentration being determined so as to provide $H_2SO_4$ contents from 1 to 7% by moles with respect to MgO.

10 gram samples of the thus obtained reagents, previously dried to 120° C., are submitted to a sulphatation treatment at 500° C., as in the preceding example. The overall sulphatation yield is, in each case, 38%, but the sulphatation velocity, as measured after a 5% conversion of the reagent, is substantially higher in the case of reagents impregnated with an aqueous solution of sulphuric acid, viz more than 0.5 converted solid per minute.

EXAMPLE VII

Reagent samples are prepared as disclosed in Example I, but with NaCl or HCl instead of KCl, in the same molar proportions.

EXAMPLE VIII

A gas desulphurization reagent is prepared from calcite, crushed down to an average grain-size of from 0.025 to 0.050 mm, sprinkled with a $CaCl_2$ aqueous solution containing the equivalent of 2% molar of $CaCl_2$ with respect to $CaCO_3$, then dried.

The powdered reagent is used in the exhaust circuit from a boiler, for flue gases or fumes containing from 0.1 to 0.5% sulphur oxides ($SO_x$), by volume; said reagent is arranged, either as a thin (2 cm) fixed bed exposed to the fumes, or, preferably, as a fluidized bed through which the fumes flow downwardly, the bed, in the latter case, being thicker (from 0.2 to 0.5 m) and the fumes being imparted the requested velocity by a blower.

The reactor containing the reagent bed is mounted in the fume-circuit between the boiler and the stack, downstream with respect to a system for removing dust from the fumes, and in a place where the temperature is above 350° C. when the boiler is in operation.

In a commercial-size plant, the reagent is arranged in two interchangeable beds in the same reactor, and reagent re-filled is controlled by means oF a device for detecting the content of $SO_x$ in the fumes, downstream of the desulphurisation system. After the reaction, the bed of absorbent, mainly constituted by calcium sulphate, can be recovered.

We claim:

1. A reagent for treating flue gases consisting of an intimate mixture of a powdered main component selected from the group consisting of calcium, magnesium, and mixed calcium and magnesium oxides, hydroxides, carbonates, bicarbonates, and mixtures thereof, and an additive selected from the group consisting of chloride and bromide salts of alkali metals, ammonium, and alkaline-earth metals, and mixtures thereof, said additive being present in an amount of from 0.1 to 15% by mole with respect to said powdered main component and having been added to or produced in the main component by impregnating the solid powdered main component with a liquid solution of said salt or of the corresponding amount of hydrochloric acid or hydrobromic acid and removing the solvent by drying.

2. A reagent according to claim 1, wherein said main component is $CaCO_3$ and said additive is $CaCl_2$, KCl or NaCl.

3. A reagent according to claim 1, wherein the amount of said additive is from 0.1% to 5% with respect to said main component.

4. A reagent according to claim 1 wherein said reagent is in the form of a powder with an average grain size from 1 to 200 microns.

5. A method for preparing a reagent for treating flue gases comprising providing a powdered main component selected from the group consisting of calcium, magnesium, and mixed calcium and magnesium oxides, hydroxides, carbonates, bicarbonates, and mixtures thereof, impregnating said powdered main component with a liquid solution containing a total amount of from 0.1 to 15% by mole with respect to said main component of an hydrogen halide, which is hydrochloric or hydrobromic acid or a salt thereof with an alkali metal, ammonium, or an alkaline-earth metal, or mixtures thereof, or sulfuric acid, and removing the remaining solvent by drying said impregnated main component.

6. A method according to claim 5, wherein the amount of liquid is not more than 2 milliliters per gram of solid reagent.

7. A method according to claim 5, wherein said drying is carried out at a temperature from 120° to 250° C.

8. A method according to claim 5, wherein said main component is magnesia and said additive is sulphuric acid.